United States Patent
Porter

[11] Patent Number: 6,151,987
[45] Date of Patent: Nov. 28, 2000

[54] STEERING WHEEL GRIPPING HANDLE

[76] Inventor: Daniel S. Porter, 40231 N. Dell Dr., Antioch, Ill. 60002

[21] Appl. No.: 09/190,569

[22] Filed: Nov. 12, 1998

[51] Int. Cl.[7] ........................................ G05G 1/10
[52] U.S. Cl. .................. 74/557; 403/322.4; 403/325; 16/422; 16/444; 16/446
[58] Field of Search .................. 74/552, 557; 403/322.4, 403/325; 16/422, 444, 446

[56] References Cited

U.S. PATENT DOCUMENTS

| | | | |
|---|---|---|---|
| 406,995 | 7/1889 | Crafts | 16/444 |
| 1,278,552 | 9/1918 | Allmand | 16/444 |
| 1,564,736 | 12/1925 | Whelan et al. | 74/557 |
| 1,575,848 | 3/1926 | Laubach | 74/557 |
| 2,168,961 | 8/1939 | Ragan | 74/557 |
| 2,410,258 | 10/1946 | Bechik et al. | 16/444 |
| 2,437,575 | 3/1948 | White | 74/557 |
| 2,561,961 | 7/1951 | White | 74/557 |
| 2,639,158 | 5/1953 | Procos | 403/325 |
| 2,716,903 | 9/1955 | Hansen | 74/557 |
| 2,729,116 | 1/1956 | Arnold | 74/557 |
| 2,790,330 | 4/1957 | Sinko | 74/557 |
| 3,240,519 | 3/1966 | Weasler | 403/325 |
| 5,283,137 | 2/1994 | Ching | 16/444 |
| 5,289,736 | 3/1994 | Fujimori | 74/557 |
| 5,520,071 | 5/1996 | Jones | 74/557 |
| 5,915,712 | 6/1999 | Stephenson et al. | 16/422 |

*Primary Examiner*—David A. Bucci
*Assistant Examiner*—Chong H. Kim

[57] ABSTRACT

A vehicular steering handle is provided which is adapted for use with a mounting assembly mounted on a steering wheel of a vehicle. The vehicle steering handle includes a linear inboard portion and an outboard portion integrally coupled to the linear inboard portion and having an oval configuration.

5 Claims, 2 Drawing Sheets

STEERING WHEEL GRIPPING HANDLE

BACKGROUND OF THE INVENTION

1. Field of the Invention

The present invention relates to steering wheels and related components and more particularly pertains to a new steering wheel gripping handle for making it easier to grip and turn a steering wheel by a weak-handed individual who has trouble operating the steering wheel in a conventional manner.

2. Description of the Prior Art

The use of steering wheels and related components is known in the prior art. More specifically, steering wheels and related components heretofore devised and utilized are known to consist basically of familiar, expected and obvious structural configurations, notwithstanding the myriad of designs encompassed by the crowded prior art which have been developed for the fulfillment of countless objectives and requirements.

Known prior art steering wheels and related components include U.S. Pat. No. 5,163,339; U.S. Pat. No. 4,800,776; U.S. Pat. No. 2,439,636; U.S. Pat. No. 3,142,200; U.S. Pat. No. 4,964,648; and Foreign Patent EP 0 520 149 A2.

In these respects, the steering wheel gripping handle according to the present invention substantially departs from the conventional concepts and designs of the prior art, and in so doing provides an apparatus primarily developed for the purpose of making it easier to grip and turn a steering wheel by a weak-handed individual who has trouble operating the steering wheel in a conventional manner.

SUMMARY OF THE INVENTION

In view of the foregoing disadvantages inherent in the known types of steering wheels and related components now present in the prior art, the present invention provides a new steering wheel gripping handle construction wherein the same can be utilized for making it easier to grip and turn a steering wheel by a weak-handed individual who has trouble operating the steering wheel in a conventional manner.

The general purpose of the present invention, which will be described subsequently in greater detail, is to provide a new steering wheel gripping handle apparatus and method which has many of the advantages of the steering wheels and related components mentioned heretofore and many novel features that result in a new steering wheel gripping handle which is not anticipated, rendered obvious, suggested, or even implied by any of the prior art steering wheels and related components, either alone or in any combination thereof.

To attain this, the present invention generally comprises a vehicular steering handle which is adapted for use with a mounting assembly mounted on a steering wheel of a vehicle. The vehicle steering handle includes a linear inboard portion and an outboard portion integrally coupled to the linear inboard portion and having an oval configuration. The handle is formed of a steel bar which is removably and rotatably coupled to the mounting assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new steering wheel gripping handle apparatus and method which has many of the advantages of the steering wheels and related components mentioned heretofore and many novel features that result in a new steering wheel gripping handle which is not anticipated, rendered obvious, suggested, or even implied by any of the prior art steering wheels and related components, either alone or in any combination thereof.

It is another object of the present invention to provide a new steering wheel gripping handle which may be easily and efficiently manufactured and marketed.

It is a further object of the present invention to provide a new steering wheel gripping handle which is of a durable and reliable construction.

An even further object of the present invention is to provide a new steering wheel gripping handle which is susceptible of a low cost of manufacture with regard to both materials and labor, and which accordingly is then susceptible of low prices of sale to the consuming public, thereby making such steering wheel gripping handle economically available to the buying public.

Still yet another object of the present invention is to provide a new steering wheel gripping handle which provides in the apparatuses and methods of the prior art some of the advantages thereof, while simultaneously overcoming some of the disadvantages normally associated therewith.

Still another object of the present invention is to provide a new steering wheel gripping handle for making it easier to grip and turn a steering wheel by a weak-handed individual who has trouble operating the steering wheel in a conventional manner.

Even still another object of the present invention is to provide a new steering wheel gripping handle that is adapted for use with a mounting assembly mounted on a steering wheel of a vehicle. The vehicle steering handle includes a linear inboard portion and an outboard portion integrally coupled to the linear inboard portion and having an oval configuration.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
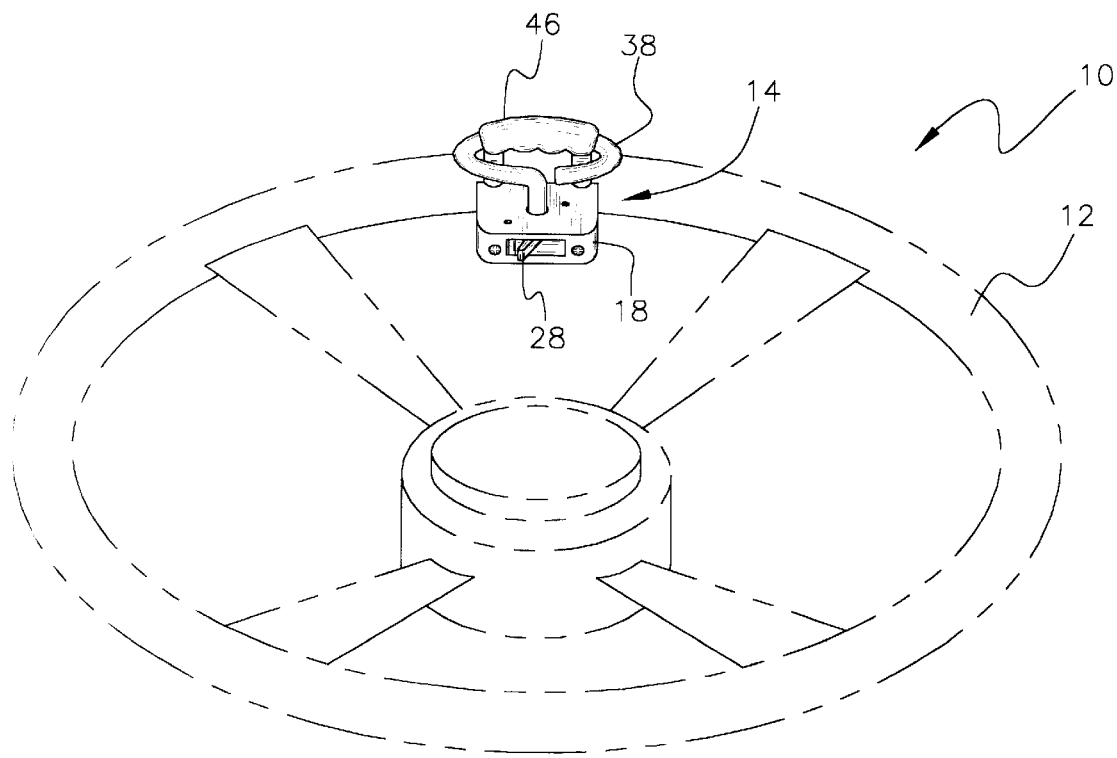
FIG. 1 is a perspective view of a new steering wheel gripping handle in use.

With reference now to the drawings, and in particular to FIGS. 1 through 5 thereof, a new steering wheel gripping handle embodying the principles and concepts of the present invention and generally designated by the reference numeral 10 will be described.

The present invention, designated as numeral 10, is adapted for use with a vehicle having a steering wheel 12 including an annular outer portion with a circular cross-section along a circumference thereof. A plurality of supports are coupled to the annular outer portion and extend inwardly therefrom. As shown in FIG. 1, a hub is connected to the supports and is further rotatably coupled with a steering column of the vehicle. By this structure, the steering wheel is adapted for allowing a user to steer the vehicle via the rotation thereof.

The present invention is further adapted for use with a mounting assembly 14 having at least one flexible clamp 16 for being removably mounted to the outer portion of the steering wheel of the vehicle. The mounting assembly further includes a housing 18 integrally mounted to the clamp and extending therefrom in coplanar relationship with an axis defined by the clamp. The clamps are each preferably attached to the housing via a screw passing through the housing and screwably engaging a threaded block at the end of the strap. Note FIG. 5.

Figure 4:
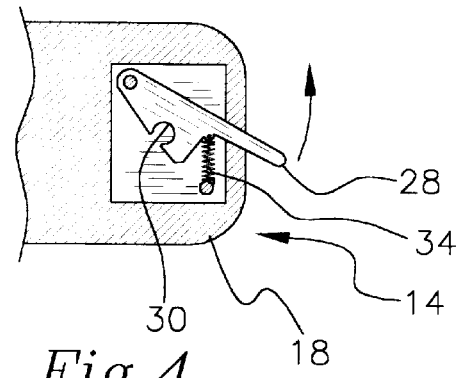
FIG. 4 is a cross-sectional view of the mounting assembly without the handle of the present invention.
Figure 5:
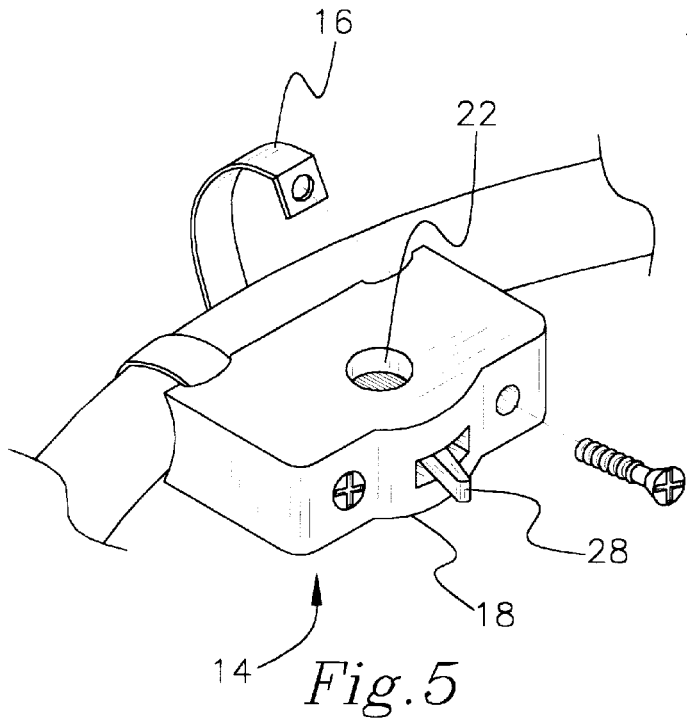
FIG. 5 is a perspective view of the mounting assembly without the handle of the present invention.

The housing includes a bore 22 formed in a top face thereof which remains in communication with an interior space of the housing. As shown in FIG. 4, a locking arm has an inboard end pivotally mounted within the interior space of the housing. An outboard end of the locking arm 28 extends through a slot formed in a periphery of the housing opposite the clamp. For reasons that will soon become apparent, a circular recess 30 is formed on the locking arm. Such circular recess has a diameter less than that of the bore. With reference still to FIG. 4, a spring 34 is shown to be connected between the locking arm and the housing.

During operation, the locking arm has an unbiased orientation with the circular recess being in coaxial alignment with an axis of the bore of the housing. Further, the locking arm has a biased orientation with the circular recess and locking arm offset from the axis of the bore. It should be understood that the mounting assembly may take many various forms depending on the desires of the user.

Figure 2:
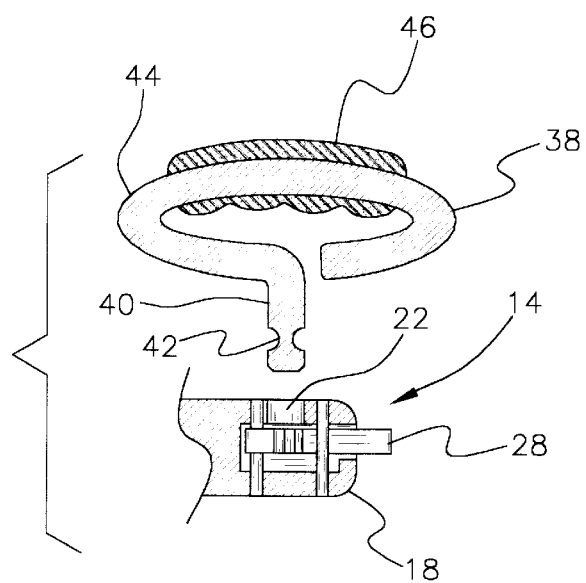
FIG. 2 is an exploded cross-sectional view of the handle of the present invention in combination with the mounting assembly.
Figure 3:
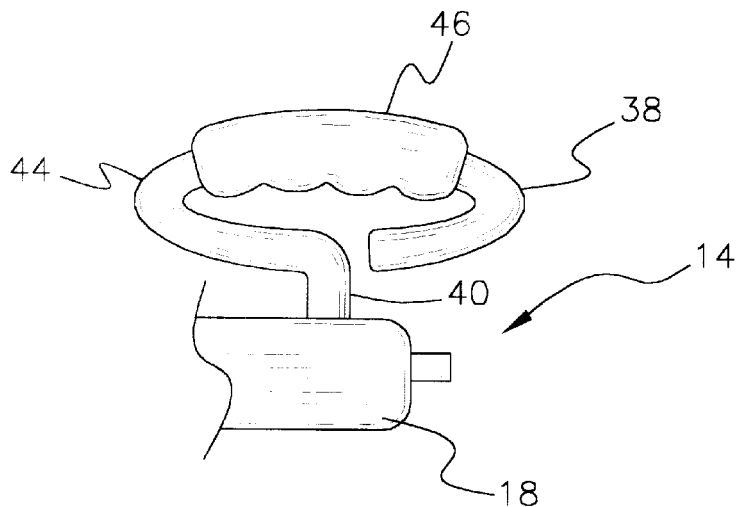
FIG. 3 is a side view of the handle of the present invention in combination with the mounting assembly.

The present invention includes a handle 38 formed of a steel bar with a diameter equal to that of the bore of the housing of the mounting assembly. As shown in FIG. 2, the handle includes a linear inboard portion 40 with a free end and a length of about 1 inch. An annular groove 42 is formed in the inboard portion adjacent to the free end. It should be noted that the groove has a diameter equal to that of the circular recess of the locking arm of the mounting assembly. The steel bar handle further includes an outboard portion 44 bent to have an oval configuration. In the preferred embodiment, the outboard portion is equipped with a length of about 3 and ½ inches and a width of about 1 inch. The outboard portion resides in a plane in which the entire inboard portion resides.

The outboard extent of the handle also includes a gripping extent 46 formed along an outboard portion thereof. As shown in the various Figures, the griping extent has a diameter greater than a remaining portion of the handle. Further, a plurality of undulations are formed along an inboard edge of the gripping extent. It should be noted that the gripping extent may be constructed from a cushioned material or, in the alternative, a metallic material similar to that from which the remaining portions of the handle are constructed.

In use, the inboard portion of the handle is removably and rotatably coupled within the bore of the housing of the mounting assembly. As such, the handle is rotatable about an axis which is parallel with that about which the steering wheel is rotatable. This permits a handicapped user or any other person to conveniently rotate the steering wheel.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicular steering system comprising:

a steering wheel for a vehicle including an annular outer portion with a circular cross-section along a circumference thereof a plurality of supports coupled to the annular outer portion and extending inwardly therefrom, a hub connected to the supports and further rotatably coupled with a steering column of the vehicle for allowing a user to steer the vehicle via the rotation of the steering wheel;

a mounting assembly including at least one clamp for being removably mounted to the outer portion of the steering wheel of the vehicle, the mounting assembly further including a housing integrally mounted to the clamp and extending therefrom in coplanar relationship with an axis defined by the clamp, the housing including a bore formed in a top face thereof in communication with an interior space of the housing, a locking arm having an inboard end pivotally mounted within the interior space of the housing and an outboard end extending through a slot formed in a periphery of the housing opposite the clamp with the locking arm having a circular recess formed therein with a diameter less than that of the bore, and a spring connected between the locking arm and the housing and being situated within the interior space of the housing, wherein the locking arm has an unbiased orientation with the circular recess being in coaxial alignment with an axis of the bore and a biased orientation with the circular recess and locking arm offset from the axis of the bore; and a handle including a steel bar with a diameter equal to that of the bore of the housing of the mounting assembly, the handle including a linear inboard portion with a free end and an annular groove formed in the inboard portion adjacent to the free end wherein the groove has a diameter equal to that of the circular recess of the locking arm of the mounting assembly, the steel bar handle further including an outboard portion bent to have an oval configuration with a length of approximately 3 and ½ inches and a width of approximately 1 inch, the outboard portion residing in a plane in which the entire inboard portion resides and including a gripping extent formed along a portion thereof, the gripping extent having a diameter greater than a remaining portion of the handle and further including a plurality of undulations formed along an inboard edge thereof;

wherein the inboard portion of the handle is removably and rotatably coupled within the bore of the housing of the mounting assembly such that the handle is rotatable about an axis which is parallel with that about which the steering wheel is rotatable.

2. A vehicular steering system comprising:

a mounting assembly including at least one clamp for being removably mounted to the outer portion of the steering wheel of the vehicle, the mounting assembly further including a housing integrally mounted to the clamp and extending, the housing including a bore formed in a top face thereof in communication with an interior space of the housing, a locking arm having an inboard end pivotally mounted in the interior space of the housing and an outboard end extending through a slot formed in a periphery of the housing opposite the clamp with the locking arm having a recess formed therein, and a spring connected between the locking arm and the housing and being situated in the interior space of the housing, wherein the locking arm has an unbiased orientation with the circular recess being in coaxial alignment with an axis of the bore and a biased orientation with the recess and locking arm offset from the axis of the bore; and a handle including a bar with a diameter substantially equal to that of the bore of the housing of the mounting assembly, the handle including an inboard portion with a free end and an annular groove formed in the inboard portion adjacent to the free end wherein the groove has a diameter substantially equal to that of the circular recess of the locking arm of the mounting assembly, the bar handle further including an outboard portion, the outboard portion residing in a plane in which the entire inboard portion resides;

wherein the inboard portion of the handle is removably and rotatably coupled in the bore of the housing of the mounting assembly such that the handle is rotatable about an axis which is parallel with that about which the steering wheel is rotatable.

3. The system of claim 2 additionally comprising a steering wheel for a vehicle including an annular outer portion with a circular cross-section along a circumference thereof, a plurality of supports coupled to the annular outer portion and extending inwardly therefrom, a hub connected to the supports and further rotatably coupled with a steering column of the vehicle for allowing a user to steer the vehicle via the rotation of the steering wheel.

4. The system of claim 2 additionally comprising a gripping extent formed along a portion thereof, the gripping extent having a diameter greater than a remaining portion of the handle and further including a plurality of undulations formed along an inboard edge thereof.

5. The system of claim 2 additionally comprising a steering wheel for a vehicle including an annular outer portion, a plurality of supports coupled to the annular outer portion and extending inwardly therefrom, a hub connected to the supports, and a gripping extent formed along a portion thereof, the gripping extent having a diameter greater than a remaining portion of the handle and further including a plurality of undulations formed along an inboard edge thereof.

* * * * *